United States Patent
Wang et al.

(10) Patent No.: US 10,142,422 B2
(45) Date of Patent: Nov. 27, 2018

(54) CLUSTERING WEBSOCKET COMMUNICATIONS WITH CONFIGURABLE MASTER-SLAVE SERVERS

(71) Applicant: SAP SE, Walldorf (DE)

(72) Inventors: Gang Wang, Port Coquitlam (CA); Walter Mak, North Vancouver (CA); Tsz Hong Sung, Richmond (CA); Pak Man Chan, Vancouver (CA); Jeffry Ma, Vancouver (CA); Ka Wing Hui, Vancouver (CA)

(73) Assignee: SAP SE, Walldorf (DE)

( * ) Notice: Subject to any disclaimer, the term of this patent is extended or adjusted under 35 U.S.C. 154(b) by 294 days.

(21) Appl. No.: 15/224,008

(22) Filed: Jul. 29, 2016

(65) Prior Publication Data
US 2017/0331900 A1  Nov. 16, 2017

Related U.S. Application Data

(60) Provisional application No. 62/336,333, filed on May 13, 2016.

(51) Int. Cl.
*G06F 15/16* (2006.01)
*H04L 29/08* (2006.01)

(52) U.S. Cl.
CPC ............ *H04L 67/125* (2013.01); *H04L 67/02* (2013.01); *H04L 67/10* (2013.01); *H04L 67/1029* (2013.01); *H04L 67/14* (2013.01); *H04L 67/141* (2013.01); *H04L 67/24* (2013.01)

(58) Field of Classification Search
None
See application file for complete search history.

(56) References Cited

U.S. PATENT DOCUMENTS

| | | | |
|---|---|---|---|
| 2011/0193932 A1* | 8/2011 | Long | H04L 12/1827 348/14.07 |
| 2014/0181217 A1* | 6/2014 | Jolfaei | G06F 9/542 709/206 |
| 2015/0127740 A1* | 5/2015 | Mei | H04M 3/56 709/204 |
| 2017/0034252 A1* | 2/2017 | Wong | H04L 67/1002 |

* cited by examiner

*Primary Examiner* — Joshua Joo
(74) *Attorney, Agent, or Firm* — Fountainhead Law Group P.C.

(57) ABSTRACT

Embodiments provide clustering of websocket communications with configurable master-slave servers. A centralized document service accessible to each server functions as a repository for cluster server information, cluster master server IP address, and security information. Upon receiving a first input, a server references the document service to create a first websocket handler as the master (e.g., utilizing a flag). Upon receiving a second input, a different server references the document service to create a slave websocket handler. Using master server IP address information from the document service, the slave websocket handler establishes a websocket cluster channel with the master websocket handler. Additional websocket channels with the master websocket hander may be established as further inputs are received and slave websocket handlers created. Allowing configuration as masters or slaves on a per-cluster basis, allows servers to function in dual roles, avoiding the bottleneck of requiring a same master server for all clusters.

20 Claims, 16 Drawing Sheets

Meeting Service Metadata

| Structure | | Values | | | |
|---|---|---|---|---|---|
| Tenant Id | | | | | |
| | Room Id | | | | |
| | Presenter User Name | CompanyA | | | |
| | Presenter Security Token | XXABC123 | | | |
| | Master IP Address | Owner1 | | | |
| | Document | TT114435 | | | |
| | Room Data | 10.22.3.3.44 | | | |
| | Participant List / Security Info | RoomName4 | | | |
| | | Employee1 | Employee2 | Employee10 | Employee13 |
| | Room Id | YYABC456 | | | |
| | Presenter User Name | Accountant55 | | | |
| | Presenter Security Token | ABC9988 | | | |
| | Master IP Address | 10.55.66.77 | | | |
| | Document | RoomName9 | | | |
| | Room Data | Accountant7 | Employee9 | CFO6 | |
| | Participant List / Security Info | | | | |
| Tenant Id | | Company2 | | | |

FIG. 4A1

```
if (isMaster) {
    broadcastMessageToResource("{\"user\":\"" + userName + "\",\"action\":\"join\"}", resourceFactory.find(masterUuid));  } A
} else if (masterSrv != null) {
    WebsocketClusterMessageSender.sendMessage(masterSrv, tenant, room, userName,
        "{\"action\":\"join\"}");  } B
} else {
    String role = this.getSecurityInspection().get(Probocol.getResources()).get(getRequest()).getPublished().getPublished();  } C
    get("role");
    if (role.equals("role presenter")) {
        isMaster = true;
        masterUuid = this.getSecurityInspection().get(Probocol.getResources()).get(getRequest()).getPublished().getPublished();
        get(userName).get("uuid");
        masterUser = userName;
    } else {
        masterSrv = DocumentService.INSTANCE.getMasterSrv(tenant, room, servicePath);
        if (masterSrv != null) {
            WebsocketClusterMessageSender.sendMessage(masterSrv, tenant, room, userName,
                "{\"user\":\"" + userName + "\",\"action\":\"join\"}");  } D
        }
    }
}
```

FIG. 4B1

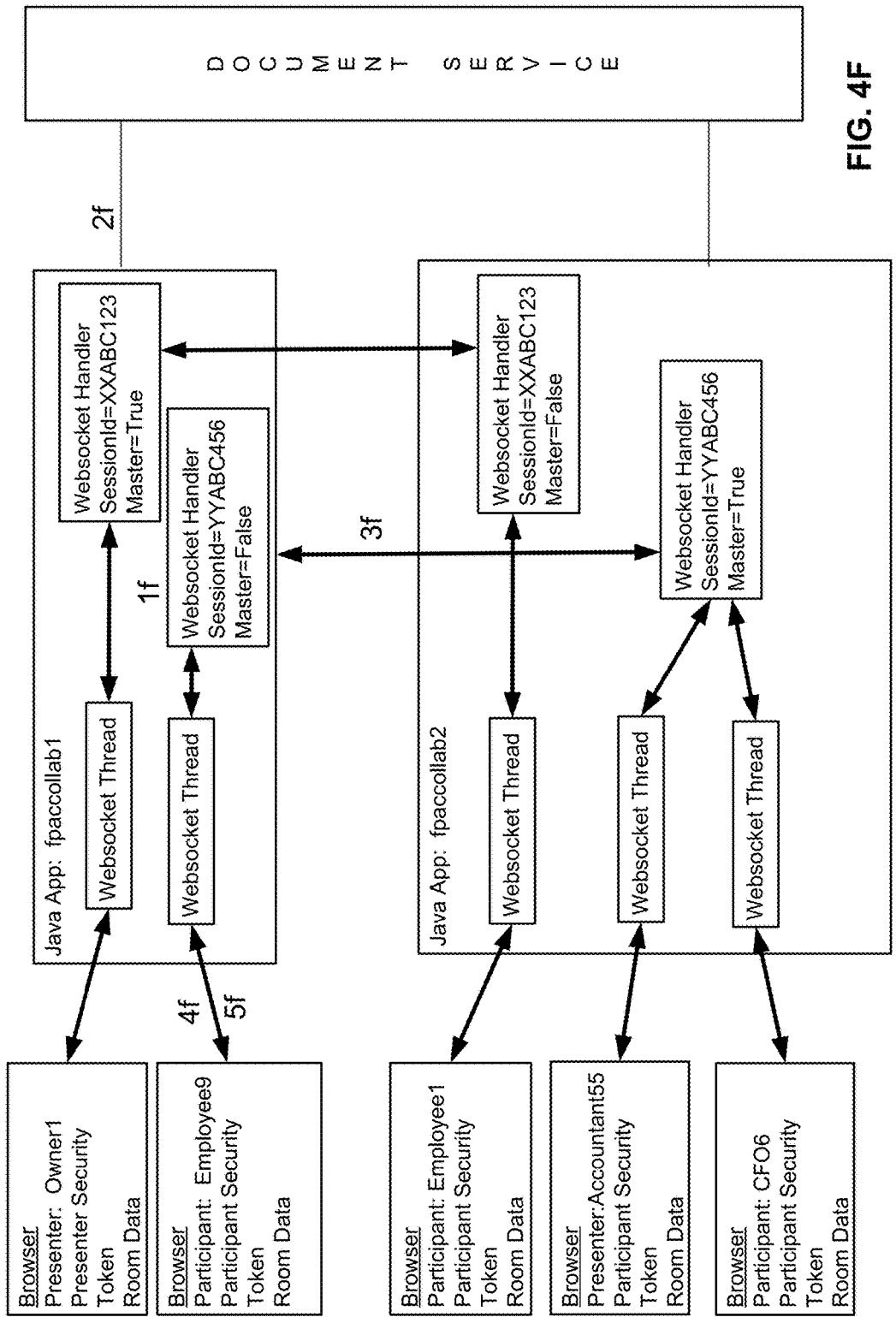

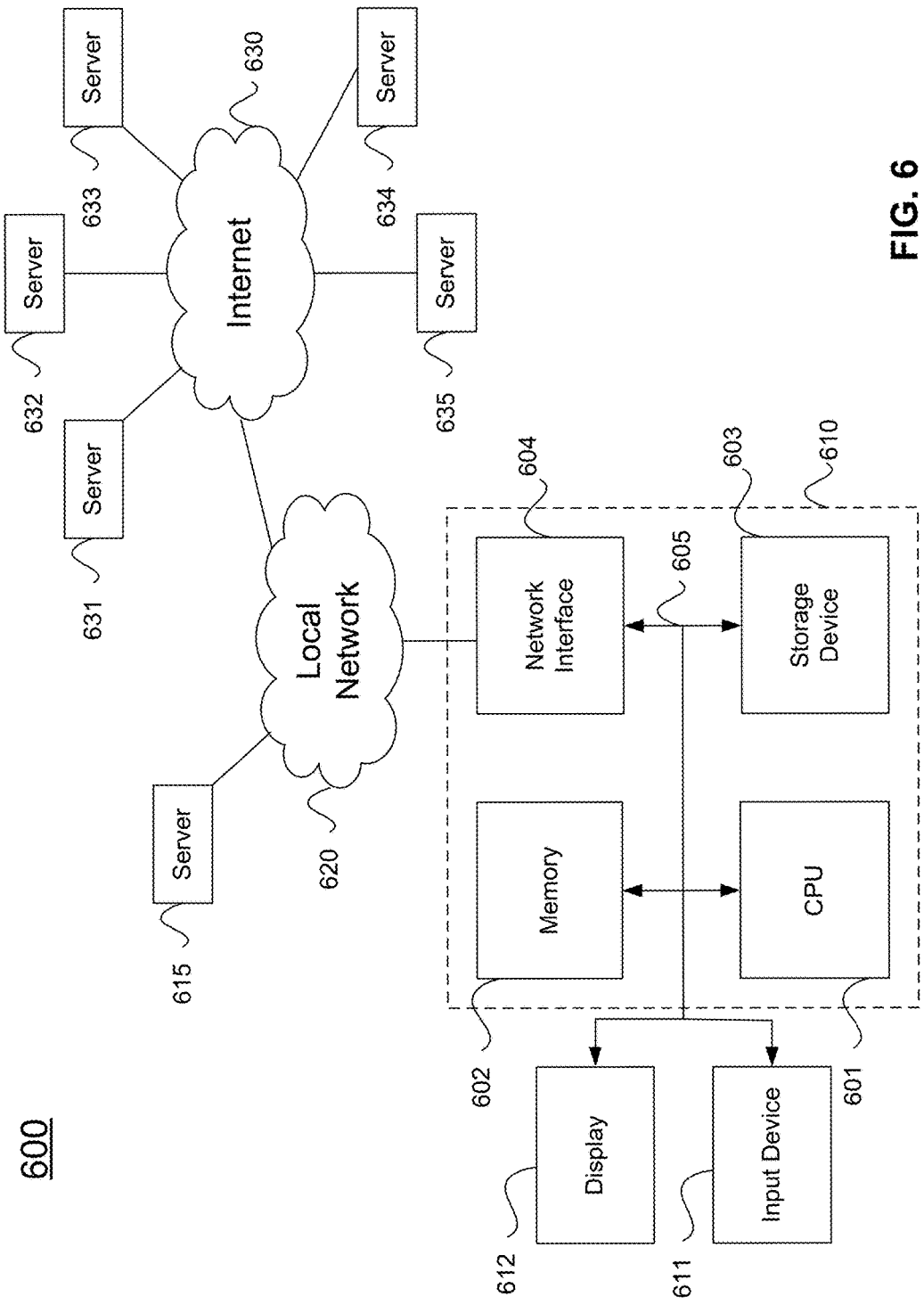

CLUSTERING WEBSOCKET COMMUNICATIONS WITH CONFIGURABLE MASTER-SLAVE SERVERS

CROSS-REFERENCE TO RELATED APPLICATION

The instant nonprovisional patent application claims priority to U.S. Provisional Patent Appl. No. 62/336,333, filed May 13, 2016 and which is incorporated by reference in its entirety herein for all purposes.

BACKGROUND

Unless otherwise indicated herein, the approaches described in this section are not prior art to the claims in this application and are not admitted to be prior art by inclusion in this section.

Embodiments relate to data communications, and in particular, to clustering websocket communications with configurable master-slave servers.

Cloud systems afford the convenience of accessing information from a central site, irrespective of user location. Conventional cloud systems generally include a grouping of multiple serves, with one server designated as a master. The master server interacts with, and delegates certain tasks to, a plurality of slave servers.

For example, a collaboration environment typically includes a single host presenter and a variety of participants. Such a collaboration environment may be implemented on the cloud utilizing a master server providing a boardroom for the host presenter, and allowing access to documents in the boardroom for sharing with the participants. A plurality of slave servers are clustered with the master and allow the boardroom documents to be projected to the other participants.

Under such a conventional approach, however, the single master server can function as a bottleneck. That is, mass requests to the cloud system can overwhelm the available bandwidth of the single master server, delaying response time and otherwise reducing system performance.

This issue can be exacerbated where the single master server and the plurality of slave servers reside behind a load balancer that may not recognize related communications in a particular collaboration session.

SUMMARY

Embodiments provide clustering of websocket communications with configurable master-slave servers. A centralized document service accessible to each server functions as a repository for cluster server information, cluster master server IP address, and cluster security information. Upon receiving a first input, a server references the document service to create a first websocket handler as the master (e.g., utilizing a flag). A second input requesting to join the cluster is then received. Receipt of that second input at the server, results in the request being directed to the same master websocket handler. Receipt of that second input at a different server, results in the different server referencing the document service to create a second slave websocket handler. Using master server IP address information from the document service, the second (slave) websocket handler establishes a websocket cluster channel with the first (master) websocket handler. Additional websocket cluster channels may be established with the master websocket hander as further inputs are received on different servers and more slave websocket handlers are created. Allowing server configuration as master or slave on a per-cluster basis, allows servers to function in dual roles and avoid the bottleneck of requiring a same master server for all circumstances. In a cloud collaboration context, clusters corresponding to distinct meeting sessions may have a different master/presenter server and slave/participant server(s) communicating via websocket cluster channels.

An embodiment of a computer-implemented method comprises providing a document service storing server cluster information including a first cluster. A first server receives a first input specifying the first cluster. In response to the first input, the first server references the document service to create a first master websocket handler and provide a first server address in the server cluster information. A second server receives a second input specifying the first cluster. In response to the second input, the document service is referenced to create a first slave websocket handler storing the first server address. The first slave websocket handler is caused to establish a first websocket channel with the first master websocket handler using the first server address.

A non-transitory computer readable storage medium embodies a computer program for performing a method comprising providing a document service storing server cluster information including a first cluster. A first server receives a first input specifying the first cluster. In response to the first input, the first server references the document service to create a first master websocket handler with a flag having a value designating a master status, and provide a first server address in the server cluster information. A second server receives a second input specifying the first cluster. In response to the second input, the second server references the document service to create a first slave websocket handler with a flag having a value designating a slave status and store the first server address. The first slave websocket handler establishes a first websocket channel with the first master websocket handler using the first server address.

An embodiment of a computer system comprises one or more processors and a software program, executable on said computer system. The software program is configured to cause an in-memory database to store server cluster information including a first cluster, and to cause a first server to receive a first input specifying the first cluster. In response to the first input, the first server is caused to reference the document service to create a first master websocket handler and provide a first server address in the server cluster information. A second server is caused to receive a second input specifying the first cluster. In response to the second input, the second server is caused to reference the document service to create a first slave websocket handler storing the first server address. The first slave websocket handler is caused to establish a first websocket channel with the first master websocket handler using the first server address.

In certain embodiments the server cluster information further includes a second cluster and the method further comprises, the second server receiving a third input specifying the second cluster. In response to the third input, the second server references the document service to create a second master websocket handler and provide a second server address in the server cluster information. The first server receives a fourth input specifying the second cluster. In response to the fourth input, the first server references the document service to create a second slave websocket handler storing the second server address. The second slave websocket handler is caused to establish a second websocket channel with the second master websocket handler using the second server address.

According to some embodiments the first cluster comprises a collaboration session, the first input includes a first security token from a presenter of the collaboration session, the second input includes a second security token from a first participant in the collaboration session, and the cluster information includes the first security token and the second security token.

Particular embodiments further comprise broadcasting a presence of the first participant in the collaboration session to the presenter over the first websocket channel.

Various embodiments further comprise the first server receiving a fifth input specifying the collaboration session from a second participant, and the first server routing the fifth input to the first master websocket handler.

Specific embodiments further comprise the first slave websocket handler updating the server cluster information to reflect a presence of the second participant in the collaboration session.

According to certain embodiments the first master websocket handler includes a flag having a value designating a master status.

According to some embodiments the document service comprises an in-memory database.

The following detailed description and accompanying drawings provide a better understanding of the nature and advantages of embodiments.

BRIEF DESCRIPTION OF THE DRAWINGS

FIGS. 4A-4F illustrate various aspects of an example of clustering websocket communications according to an embodiment.

FIG. 6 illustrates an example computer system.

DETAILED DESCRIPTION

Described herein are methods and apparatuses that cluster websocket communications utilizing master-slave server configurations. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Embodiments provide clustering of websocket communications with configurable master-slave servers. A centralized document service accessible to each server (e.g., via http) functions as a repository for cluster server information, cluster master server IP address, and cluster security information. Upon receiving a first input, a server references the document service to create a first websocket handler as the master (e.g., utilizing a flag). A second input requesting to join the cluster is then received. Receipt of that second input at the server, results in the request being directed to the same master websocket handler. Receipt of that second input at a different server, results in the different server referencing the document service to create a second slave websocket handler. Using master server IP address information from the document service, the second (slave) websocket handler establishes a websocket cluster channel with the first (master) websocket handler. Additional websocket cluster channels may be established with the master websocket hander as further inputs are received on different servers and more slave websocket handlers are created. Allowing server configuration as master or slave on a per-cluster basis, allows servers to function in dual roles and avoid the bottleneck of requiring a same master server for all circumstances. In a cloud collaboration context, clusters corresponding to distinct meeting sessions may have a different master/presenter server and slave/participant server(s) communicating via websocket cluster channels.

Figure 1:
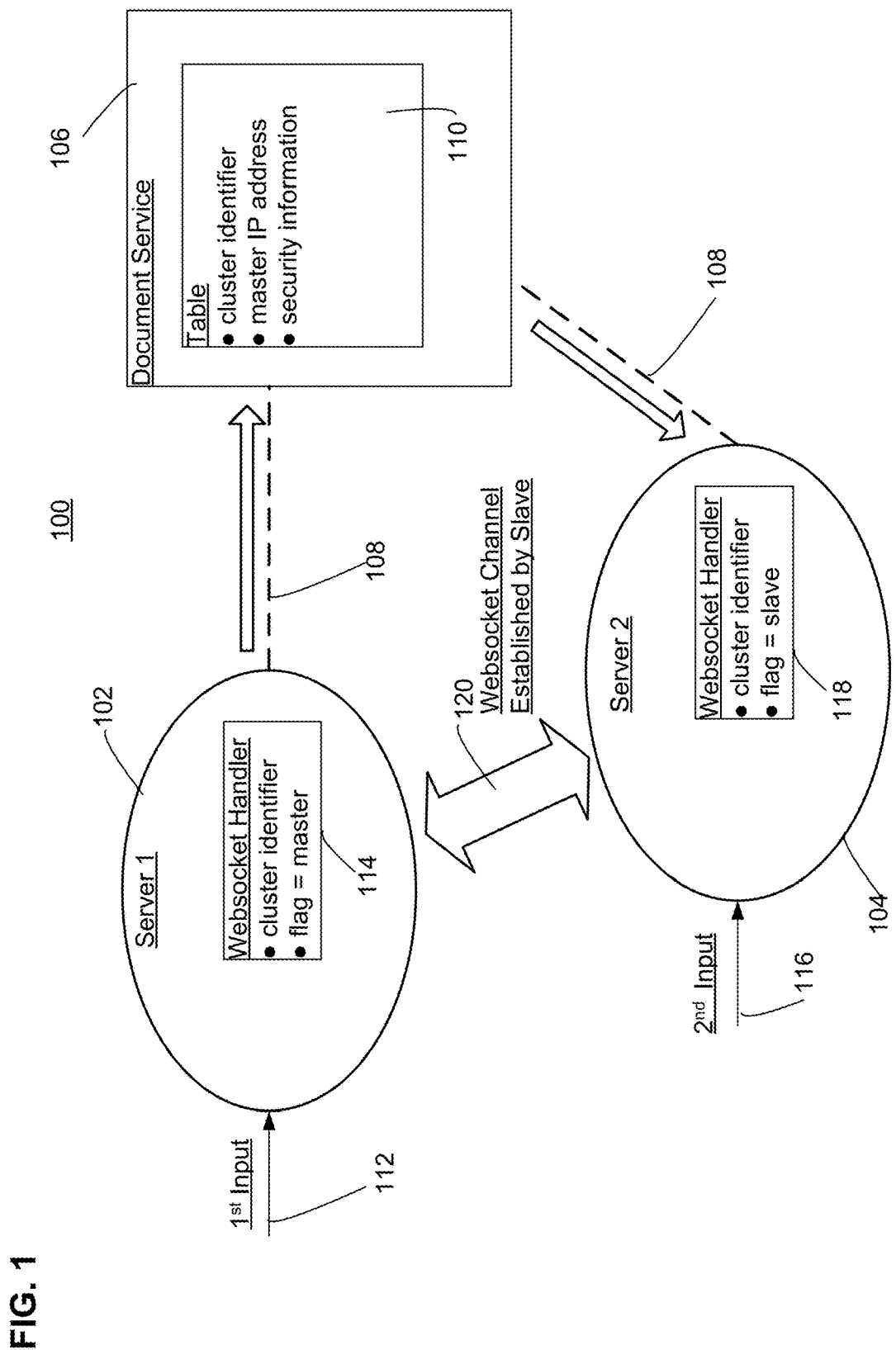
FIG. 1 shows a simplified diagram of a system according to an embodiment.

FIG. 1 presents a simplified view of a system 100 according to an embodiment. In particular, the system comprises a first server 102 and a second server 104, each of which are in communication with a document service 106 via http connections 108.

The document service 106 has stored thereon, a table 110. That table includes information relevant to configuration of the first server and the second server into a cluster connected by websockets.

In particular, the table 110 includes cluster information identifying a cluster, and includes IP address information for the server that is the master of the cluster. The table 110 further includes security information relating to the cluster. Such security information can comprise tokens allowing verification of the identity of particular servers that are communicating with the document service.

Data within the document service is provided by the first and second servers as part of a registration process preceding cluster creation. As one example, the document service may be populated with data relevant to unique meeting sessions in a cloud collaboration system.

Next, in response to a first input 112 received, the first server is configured to reference the document service and generate a websocket handler 114. In the example, the input may be a request from a meeting presenter to initiate a collaboration session. That websocket handler includes information identifying the cluster, and also includes a flag designating the websocket handler 114 as the master in that cluster.

In response to a second input 116 received, the second server is configured to reference the document service and generate a second websocket handler 118. In the example, the input may be a request from a meeting participant to join a collaboration session. That websocket handler includes information identifying the cluster, and also includes a flag designating the second websocket handler as a slave in that cluster.

Based upon its status as a slave in the cluster, and also upon the master IP address information received from the document service, the second websocket handler establishes a websocket cluster channel 120 with the first server.

The slave websocket handler may further communicate to update the document service regarding its status. In the cloud collaboration example, the slave websocket handler may update the document service to confirm the participant's joining the meeting (thereby preventing potential imposters from joining).

FIG. 1 is highly simplified for purposes of introducing the concept of clustering websocket communication. Elaborations are possible to implement multiple websocket clusters under various circumstances.

For example, third input may be received to establish a different cluster utilizing the existing server resources (i.e., the first server and the second server). In the cloud collaboration example, the third input may comprise another presenter seeking to initiate a different meeting session.

A third websocket handler is then created determining the master of that second cluster, based upon information registered in the document service. That third websocket handler will exist in the particular server receiving the third input.

Upon receipt of a fourth input, a fourth websocket handler would be created and reference the document service to determine its status as a slave in the second cluster. In the cloud collaboration example, the fourth input could comprise a participant seeking to join the second meeting session. The fourth (slave) websocket handler would then establish a websocket cluster channel with the third (master) websocket handler of the second cluster.

Figure 2:
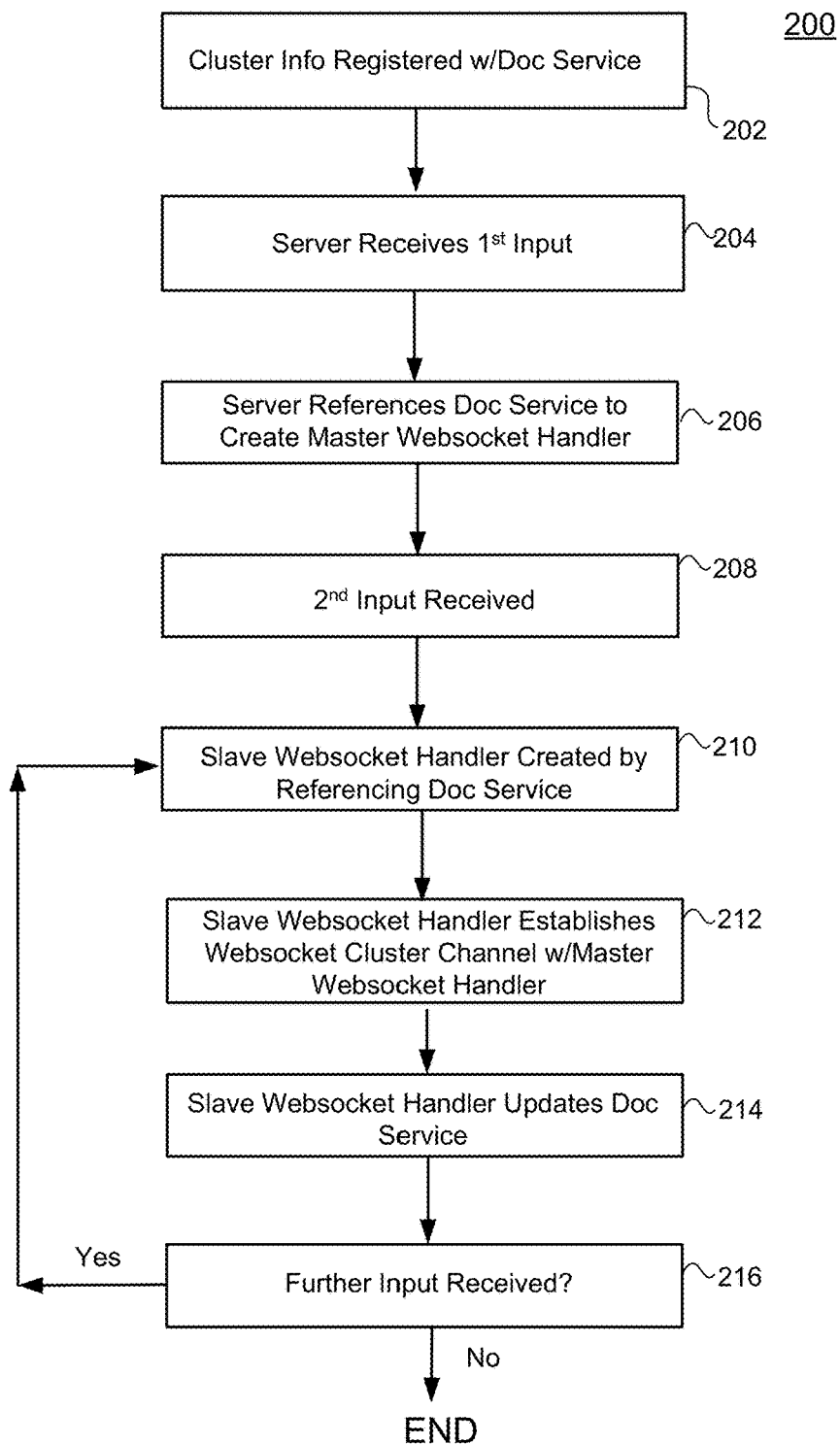
FIG. 2 illustrates a simplified process flow according to an embodiment.

FIG. 2 illustrates a simplified process flow according to an embodiment. In a first step 202, cluster information is registered with a document service.

In a second step 204, a server receives a first input specifying a cluster. In a third step 206, the server references the document service to create a master websocket handler for the cluster.

In a fourth step 208, a second input is received specifying the cluster. That second input may be received on the same or a different server receiving the first input.

In a fifth step 210 a slave websocket handler is created on the server receiving the second input, by referencing the document service. In a sixth step 212, the slave websocket handler establishes a websocket channel with the master websocket handler.

In a seventh step 214 the slave websocket handler updates the document service regarding its status.

In an eighth step 216, it is determined if another input specifying the cluster is received. If another such input is received, the flow returns to step 208 to reference the document service to create another slave websocket handler and websocket cluster channel with the master websocket handler. If no such input is received, the process flow ends.

As further illustration, FIGS. 3A-3D show various scenarios of websocket clustering in a cloud collaboration system. For each collaboration session, a single presenter seeks to share documents in a boardroom with a plurality of participants.

Figure 3A:
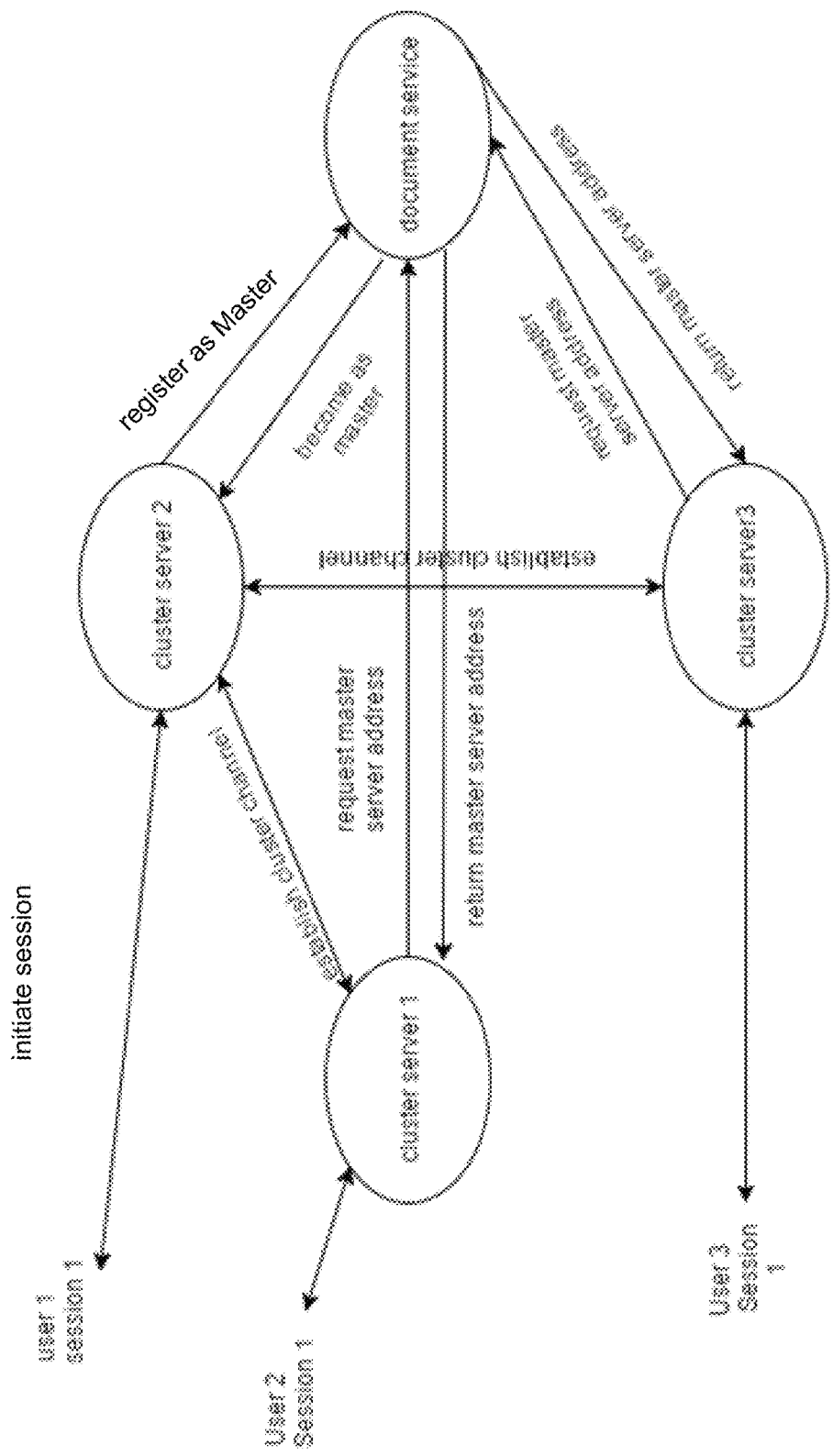
FIGS. 3A-D show examples of clustering of websocket communications under different scenarios.

FIG. 3A shows a server cluster 300 comprising three servers 302, 304, and 306. Each server is in communication with a document service 308 via an http connection.

These individual servers are not yet in communication with each other via websocket channels, however, until specific cluster channels are established. That process is now discussed.

Here, a first user (user 1) seeks to initiate a collaboration session. A load balancer happens to direct that presenter user 1 to the cluster server 2. Upon receipt of this input, the cluster server 2 sends a request to establish the server 2 as a master server with the document service. The document service designates the server 2 as the master, and returns cluster information to the server 2.

Next, a second user (user 2) seeks to join the collaboration session. The load balancer happens to direct the participant user 2 to the cluster server 1. Upon receipt of this request the cluster server 1 sends to the document service, a request for the master server address. The document server returns the master server address to the cluster server 1.

Having determined (via document server registration) that the cluster server 2 is the master server, the cluster server 1 becomes a slave server. A specific websocket cluster channel is now established to handle communication between the slave server 1 and the master server 2 for this collaboration session.

Next, a third user (user 3) seeks to join the collaboration session. The load balancer happens to direct the participant user 3 to the cluster server 3. A similar procedure as stated above then follows, with the cluster server 3 determining via the document service, the address of the master server 2. Another specific websocket cluster channel is now established to handle communication between the slave server 3 and the master server 2 for this collaboration session.

One benefit of the clustering of websocket communications according to embodiments, is flexibility. That is, a server can be designated a master or slave depending upon needs and available resources.

Figure 3B:
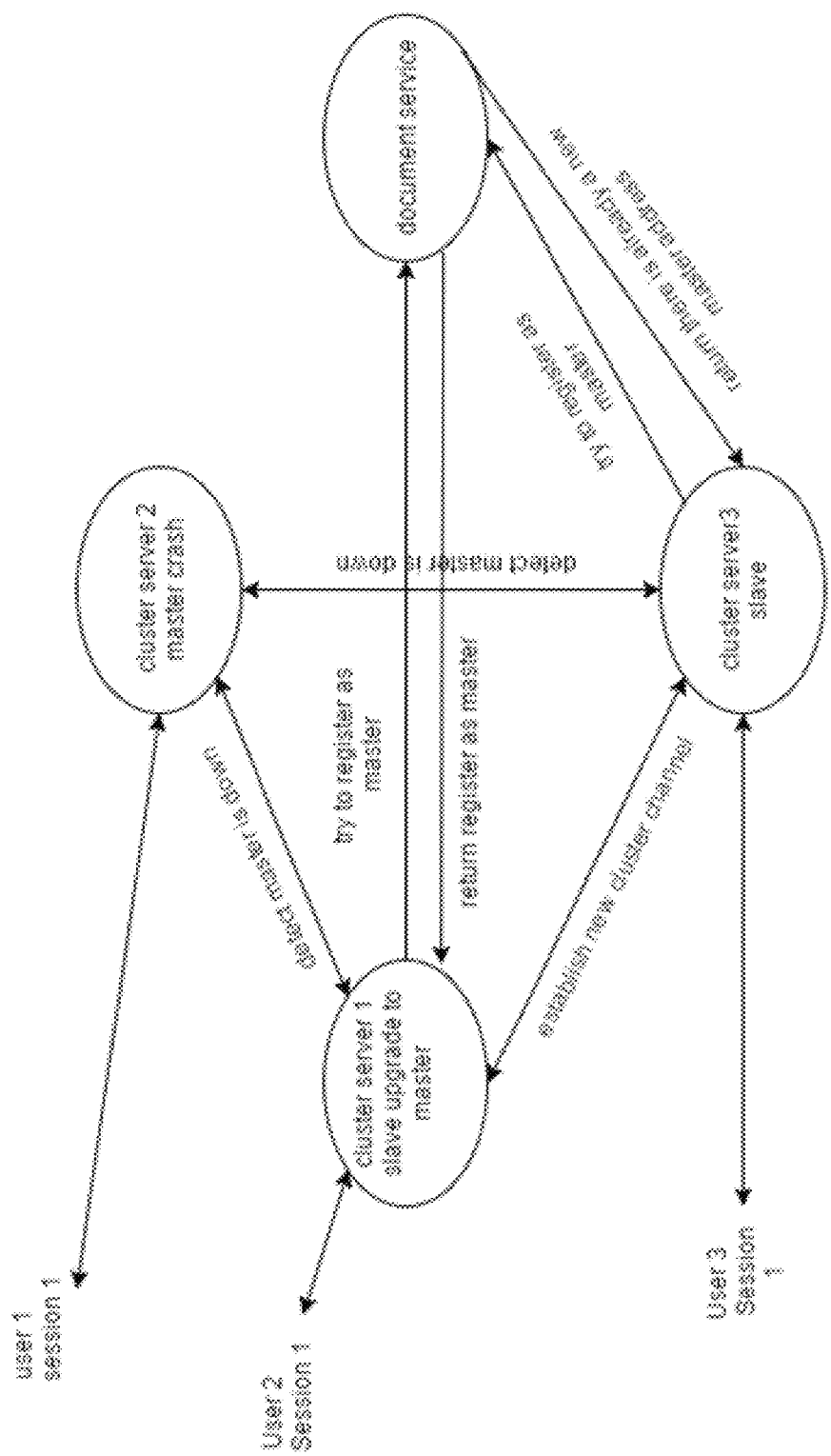

The second scenario shown in FIG. 3B illustrates this point. Here server 2 has crashed. Rather than disabling the entire collaboration session, embodiments allow reassignment of the role of master to another server within the cluster.

Specifically, FIG. 3B shows the slave cluster servers 1 and 3 as detecting the down state of the master server 2, via the cluster channels. The slave cluster server 1 then contacts the document service to try and designate as a master server for the collaboration session. The document service establishes the server 1 as the master, and returns updated information to the server 1.

Having also detected the crash of server 2, the slave server 3 also contacts the document service to try and register as a master server for the collaboration session. The document service returns a message indicating that there is already a new master address. Remaining in its role as slave, the cluster server 3 then establishes a new websocket cluster channel to handle communication between the slave server 3 and the new master server 1 for this collaboration session. (No such websocket cluster channel existed before, because both cluster server 1 and cluster server 3 were slaves).

Thus, utilizing the ability of different servers to function either as masters or slaves, embodiments allow the collaboration to continue despite a server crash.

Figure 3C:
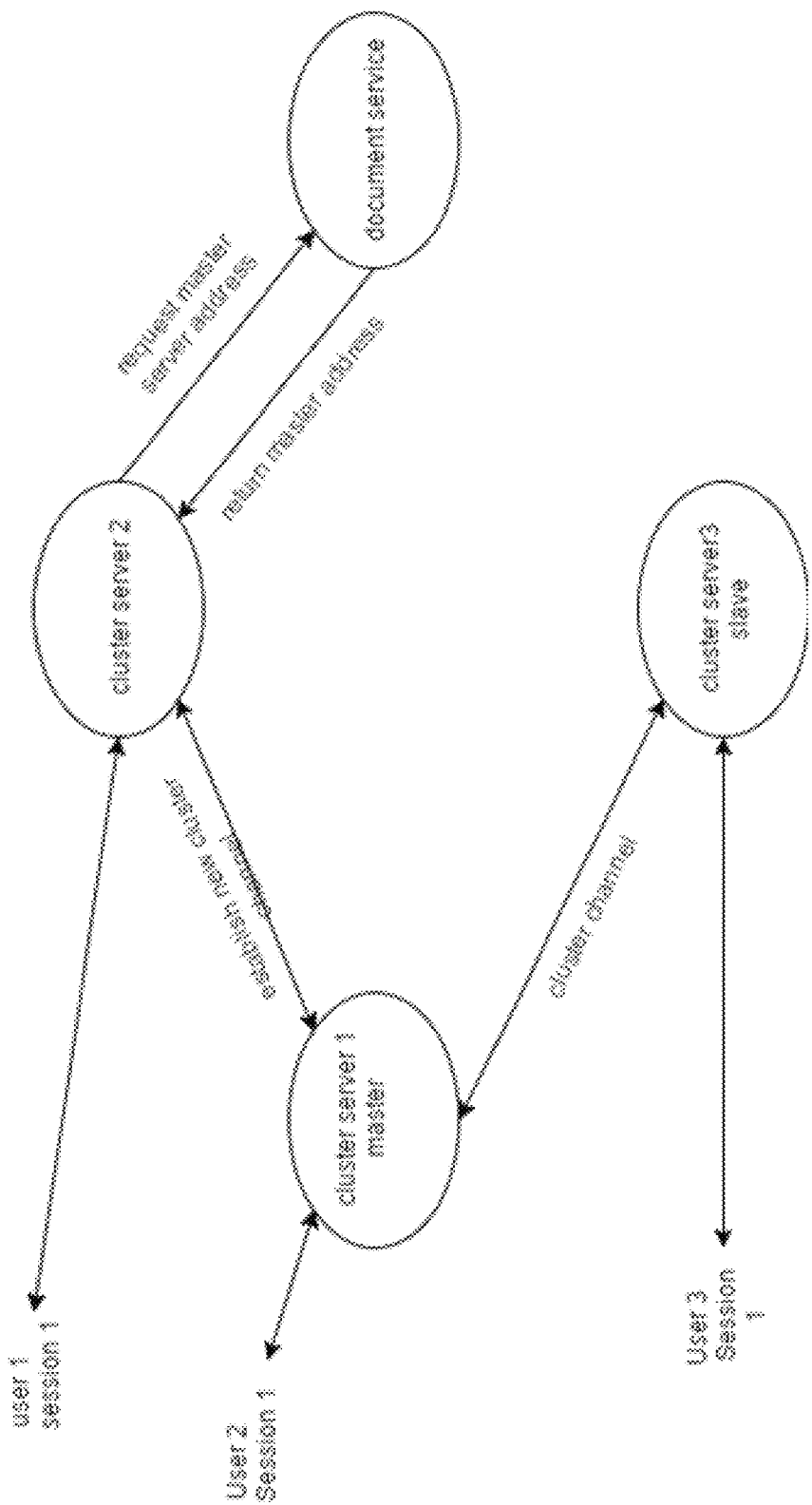

FIG. 3C illustrates a next scenario, where the crashed server 2 revives and is able to handle traffic. The user1 requests reconnection with the ongoing session, and is routed to the revived cluster server 2 by the load balancer.

The cluster server 2 contacts the document service to request the address of the master server, and that address of the master server is returned. Now functioning in the role of a slave, the cluster server 2 establishes a new websocket cluster channel with the master cluster server 1.

As explained above, embodiments allow the role of master and slave to be assigned to a particular server on a per-session basis. Thus a server functioning as a master for one collaboration session, could also function as a slave for a different collaboration system. This dual-role functionality imparts resilience to the server websocket clustering, as every session is not dependent upon the same master server and a potential bottleneck is avoided.

Figure 3D:
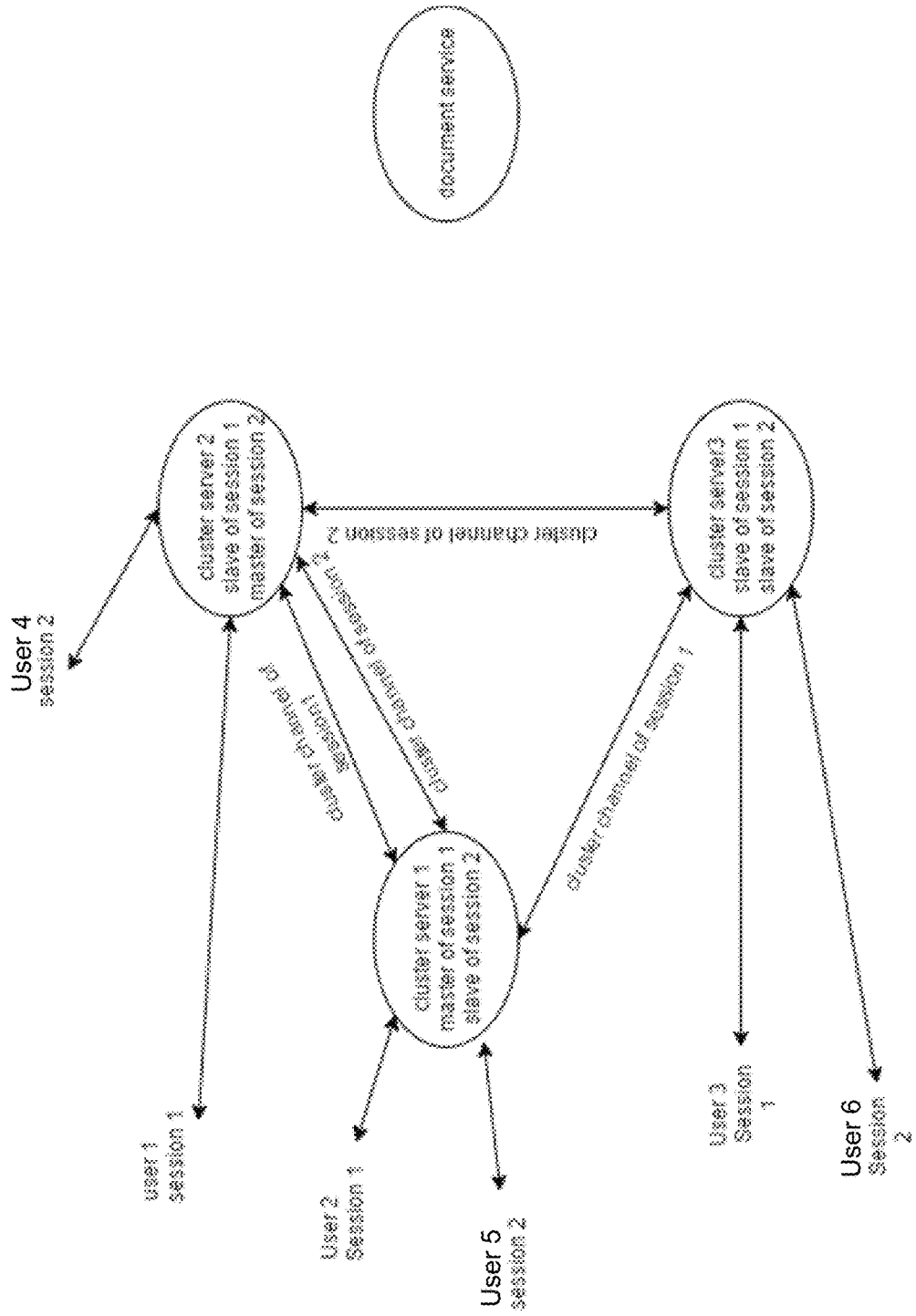

This dual role (master/slave) functionality aspect afforded by particular embodiments, is further explained in connection with a next scenario shown in FIG. 3D. Here, FIG. 3D shows a user 4 seeking to initiate a new collaboration session.

The load balancer happens to direct this new user to the cluster server 2. That cluster server 2 is operating as a slave in the original session. However, embodiments allow cluster server 2 to also function as master in the new collaboration session that is being initiated.

In particular, the cluster server 2 can reference the document service to establish its address as a master of this second session. (For ease of illustration, the multiple http communications occurring between the various servers and the document service in the scenario of FIG. 3D, are omitted).

Then, participants (e.g., user 5, user 6) to that second session can reference the document service to designate for that second session, slave servers (e.g. cluster server 1, cluster server 3) and their respective websocket connections with that master.

To further inform the aspect of a websocket cluster communications for multiple collaboration sessions, the following example is presented.

EXAMPLE

This example is provided in the context of context of the Cloud for Analytics application available from SAP SE of Walldorf, Germany. In particular, the example of FIGS. 4A-4F is implemented with the HANA Cloud Portal (HCP) also available from SAP SE of Walldorf, Germany. The HCP provides a Document Service to store shared information between Applications/Processes on the same HCP account.

Figure 4A:
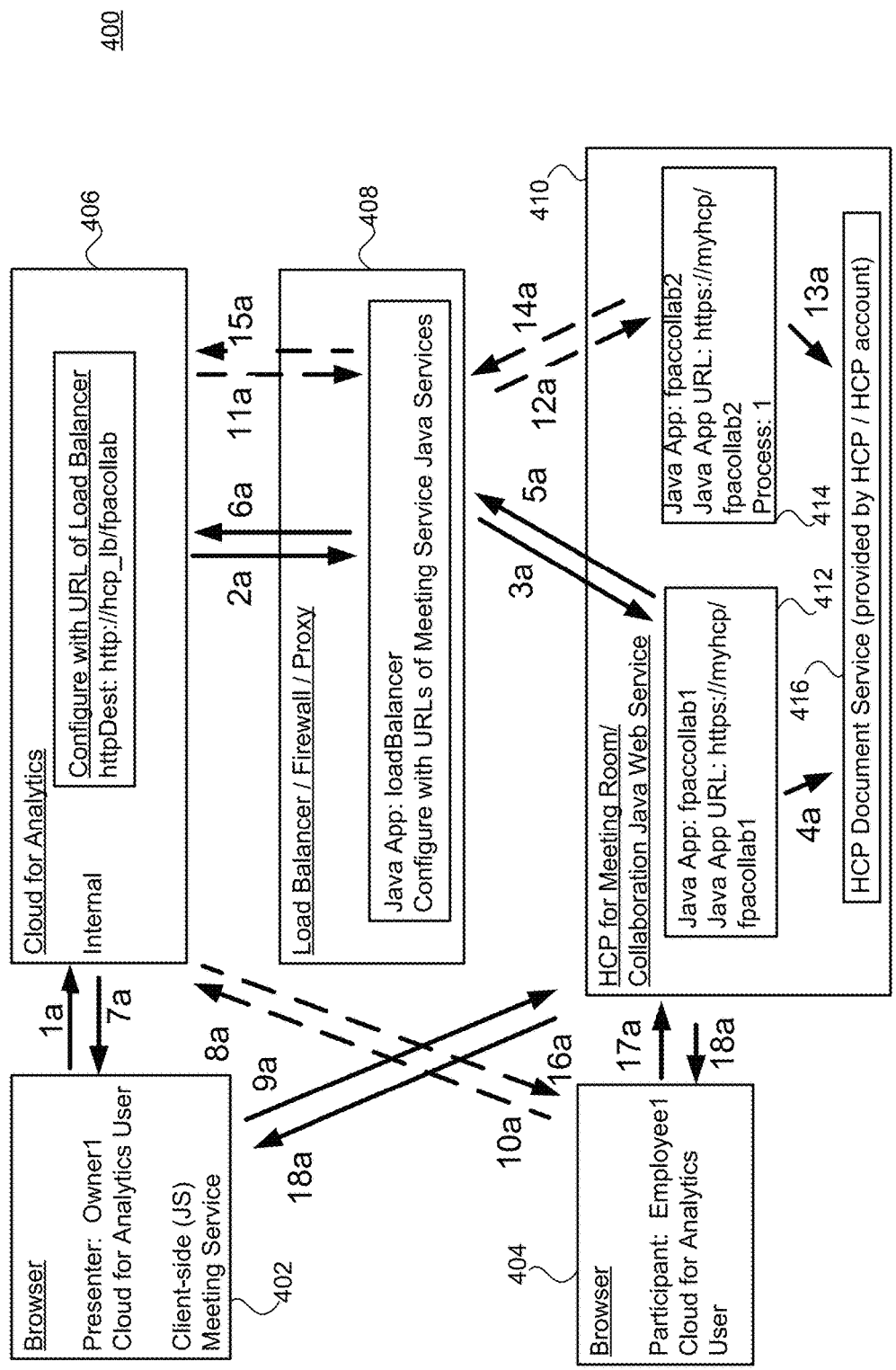

FIG. 4A shows two browsers 402 and 404 interacting with elements of the collaboration system 400, including the Cloud for Analytics application 406, a load balancer/firewall/proxy 408, and the HCP for Meeting Room/Collaboration Java Web Service 410. The HCP for Meeting Room includes two Java App servers: fpaccollab1 412 and fpaccollab2 414, and also includes a document service 416.

Here, the fpacollab collaboration application for XSJS (security & registration) is stateless. Any fpacollab application can handle the requests.

In an initial series of steps (1a-9a) illustrated in FIG. 4A and described in the table below, a meeting presenter Owner1 communicates with the collaboration system to populate various fields of the document service with identity/security information relevant to a collaboration session.

FIG. 4A1 shows details of the document service, which is responsible for storing meeting service metadata that is available to all of the servers via http requests. Pieces of information relevant to the particular collaboration session include a Tenant Id indicating the company (CompanyA) with whom the Owner1 presenter is affiliated (multiple tenant companies may use the HCP Meeting Room collaboration application).

As further shown in FIG. 4A1, the Room Id (XX-ABC123) uniquely identifies the specific collaboration session. The Room Data (RoomName4) provides a descriptive name for this collaboration session. Also included in the document service is a security token of the presenter.

FIG. 4A1 further shows the document service storing the IP address (10.22.33.44) of the server designated as the Master for the RoomName4 collaboration session XXABC123. Here, that Master server is the fpaccollab1 Java App server of FIG. 4.

In a subsequent series of steps (10a-16a) illustrated in FIG. 4A and described in the table below, a meeting participant Employee1 communicates with the collaboration system to populate various fields of the document service with identity/security information relevant to the collaboration session. This includes the name of the participant (Employee1) and security information such as security token.

The following table summarizes the numbered steps in FIG. 4A.

| Step # | Direction | Description |
|---|---|---|
| 1a | out | App request for a meeting room |
| 2a | down | API: initRoom with unique user security information E.g. internal username/session id/app id/app url |
| 3a | down | Send to fpacollab1 (example) |
| 4a | | fpacollab1 registers room info and URL:fpacollab1/room123 to Doc Service |
| 5a | up | returns unique security session token, unique room token, websocket URL |
| 6a | up | returns payload from below |
| 7a | in | tokens, websocket URL, session id, app id |
| 8a | | (app action) Presenter invites Participant(s) |
| 9a | out | Start Meeting: Connect to websocket URL + security info (post-out) Start necessary websocket channels if successful |
| 10a | | (app action)Accepts meeting request through app |
| | out | App request for join meeting info |
| 11a | down | API: joinRoom with unique user security information E.g. internal username/session id/app id/app url |
| 12a | down | Send to fpacollab2 (example) |
| 13a | | fpacollab2 updates room info and returns room URL:fpacollab1/room123 info |
| 14a | up | returns unique security session token, unique room token, websocket URL |
| 15a | up | returns payload from below |
| 16a | in | tokens, websocket URL, session id, app id |
| 17a | out | Join Room: Connect to websocket URL + security info (post-out) Start necessary websocket channels if successful |
| 18a | | (meeting established) Use websocket channel(s) for bi-directional messaging |

In FIG. 4A, steps 3a, 5a, 12a, and 14a serve to "register room info". Specifically, incoming security data from the Presenter (step 3a) and from the Participant (step 12a) will be stored in the HCP Document Service. This will result in the generation of unique tokens for the Presenter (step 5a) and for the Participant (step 14a) and the return of websocket URLs back in the upward direction shown. The generated unique tokens are also stored in the document service. In this manner, the data sent in the step 9a can be verified with the data stored in the document service.

Certain steps of FIG. 4A allow the verification of meeting room info. In particular, the collaboration application receives an incoming websocket URL from the Presenter (step 9a) and from the Participant (step 17a) to start or join a meeting.

Incoming data is verified with information stored in the HCP Document Service. If successful, an "update room info" will be run to allow creation of the websocket channel.

Specifically, steps 9a and 17a will update meeting room info and add that a session has been created. This allows the unique Load Balancer to recognize which Java App URLs to forward to via a registration process.

Various options for implementing secure websocket clustering are possible. For example, certain embodiments may return the websocket URL of the specific Java Service. Some embodiments may return a generic websocket URL to another Load Balancer/Firewall/proxy.

Figure 4B:
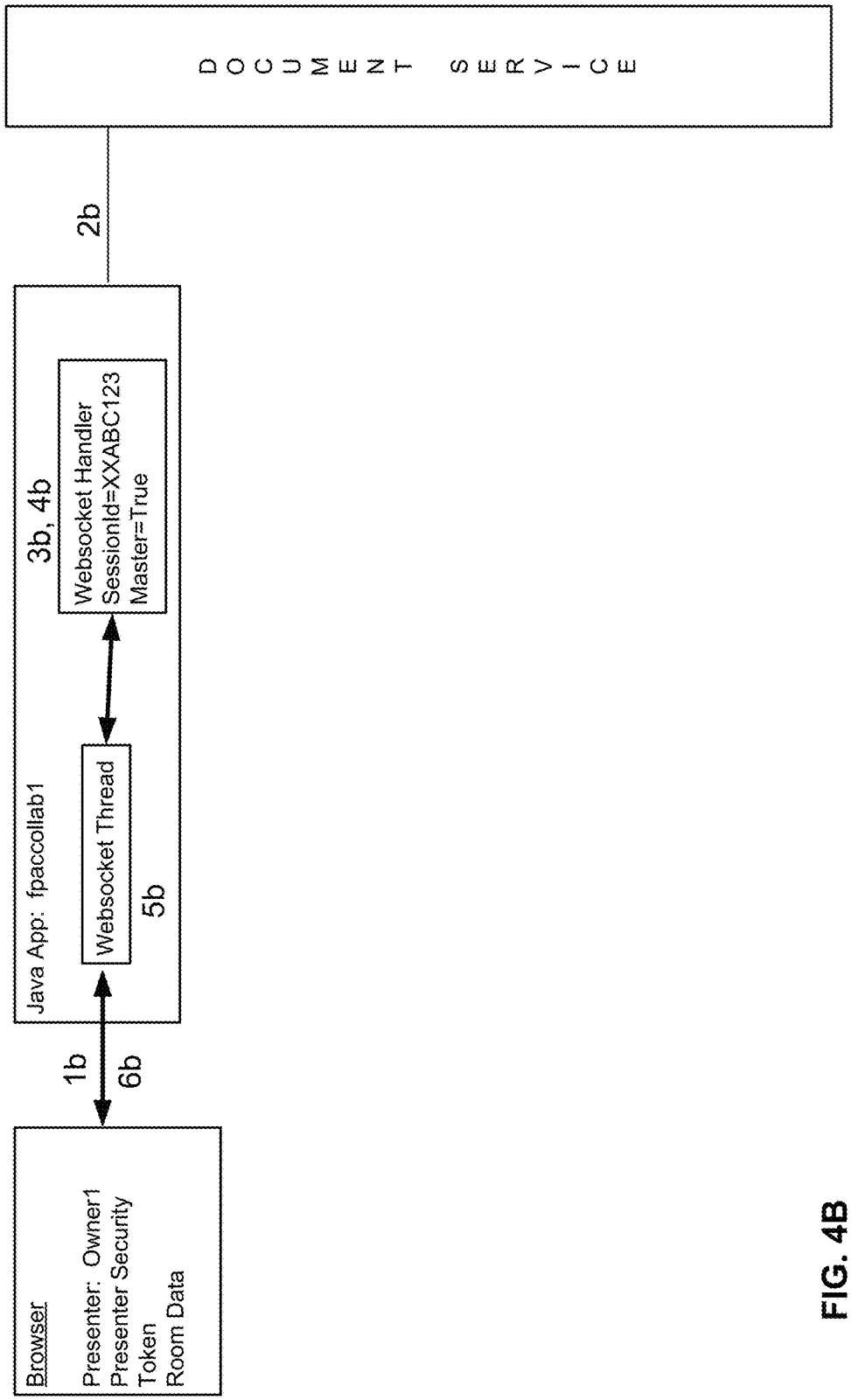
Figure 4C:
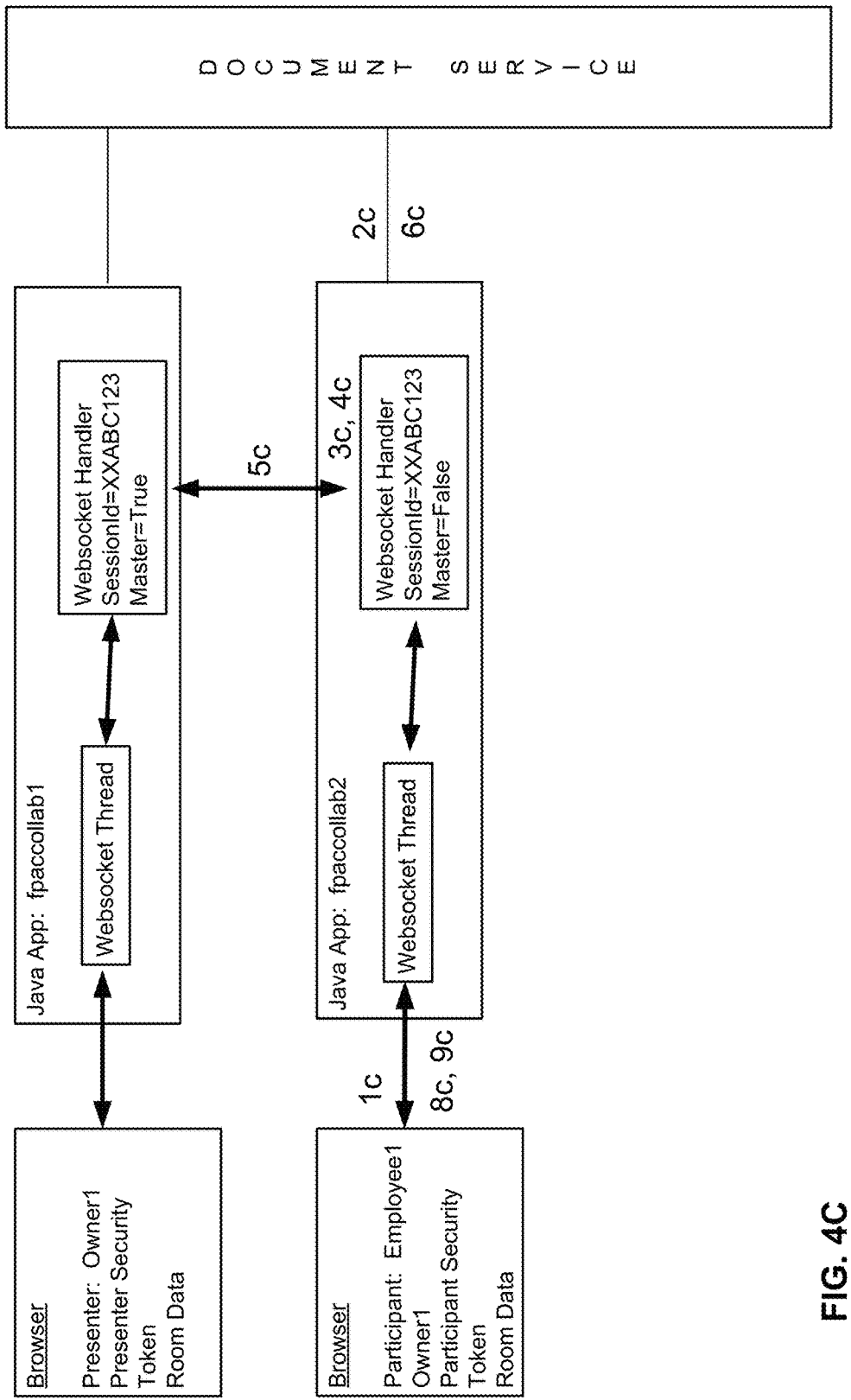

FIGS. 4B-C shows the basic workflow once the application security process of FIG. 4A is completed and the document service contains room information as in FIG. 4A1. Here, FIGS. 4B-C show the servers as including separate websocket handlers communicating with respective websocket threads.

These websocket handlers are configurable within the server in order to indicate master or slave functionality on a per-session basis. In the embodiment of this particular example, the websocket handler configurability is accomplished via a Master flag that can be set to either a true or false value.

Such websocket handler configurability allows a single server to host different websocket handlers functioning as respective master and slave in a same session. This contributes additional flexibility to the system.

FIG. 4B shows the workflow as the presenter (Owner 1) starts the meeting, with the specific steps outlined in the following table.

| Step # | Description |
| --- | --- |
| 1b | Presenter sends security information. |
| 2b | Server fpacollab1 verifies information with document service and starts new websocket handler. |
| 3b | Websocket handler sets itself as the main handler for SessionId = XXABC123. |
| 4b | Websocket handler sets itself as the master, flag master = True (only person in the meeting room). |
| 5b | Websocket Handler completes setup with Websocket Thread. |
| 6b | Verified and approved Websocket is active. |

A code excerpt in the Java programming language which may be executed to create the unique Websocket Handler threads, is shown below.

```
/**
 * WebsocketHandler
 *
 */
import org.atmosphere.config.service.ManagedService;
@ManagedService(path = "/fpacollab/{tenant}/collab/{room}")
public class CollabRoomChannel implements MeetingRoomChannel {
```

When this class is invoked, the parameters {tenant} and {room} will be filled in from information from the Document Service. As an example:
{tenant}=CompanyA
{room}=XXABC123

If the {tenant} and {room} combination is unknown in the Java App server, then a new thread will be created. For example:
a WebsocketHandler thread mapped to CompanyA and XXABC123.

If the {tenant} and {room} combination is known in the Java App server, then the existing thread reference will be used for requests.

In order to determine if a websocket handler thread is a master or a slave, the "onReady" function is run.

```
/**
 * WebsocketHandler
 *
 */
private boolean isMaster = false;
@Ready
```

```
public void onReady(final AtmosphereResource r) {
    String userName = r.getRequest( ).getParameter("userName");
    String[ ] splits = r.getRequest( ).getPathInfo( ).split("/");
    String tenant = splits[2];
    String servletPath = splits[3];
    String room = splits[4];
```

Here, request data (r.getRequest( ) . . . ) will hold information that was verified from the document service. The request will only enter this stage if the request is authentic & verified by the Document Service.

Further code to determine whether a websocket handler thread is a master or slave, is shown in FIG. 4B1. The code of FIG. 4B1 is identified as code portions A-D. Code portions A and D are discussed further below in connection with FIG. 4C.

Code portion B asks the Security class to obtain the "role" parameter of the current username from the request data (from the Document Service). This "role" was originally stored in the document service by the app layer. Before entering the websocket handler code this "role" value was retrieved and stored in the request object after the request was authenticated and verified against the document service. Code portion B thus asks the security class to get the "role" parameter of the current username from the request data (from the Document Service).

Code portion C of FIG. 4B1 indicates that if the role is a 'presenter', then the websocket handler will be made the Master for the unique combination of {tenant} and {room} keys.

FIG. 4C shows the workflow as the participant (Employee1) joints the meeting, with the specific steps outlined in the following table.

| Step # | Description |
| --- | --- |
| 1c | Participant sends security information. |
| 2c | New websocket handler starts and verifies information with the document service. |
| 3c | Websocket handler sets itself as the main handler for SessionId = XXXABC123 |
| 4c | Websocket handler sets itself as the master, flag master = False (Master already exists) |
| 5c | Websocket handler connects to the Master = Master IP address. |
| 6c | Server fpacollab2 connects/updates document service that participant joined. |
| 7c | Websocket handler completes setup with Websocket thread. |
| 8c | Verified and approved websocket is active. |
| 9c | Employee1 joined meeting is broadcast to Presenter. |

Returning to FIG. 4B1, code portion C indicates that if the role is not a 'presenter', then the web socket handler will be made the slave for the unique combination of {tenant} and {room} keys.

Code portion A of FIG. 4B1 relates to the case when the websocket handler is already created, and a participant's websocket thread is connected to this websocket handler thread. This code portion D will broadcast a message stating the participant has joined the websocket handler.

Figure 4D:
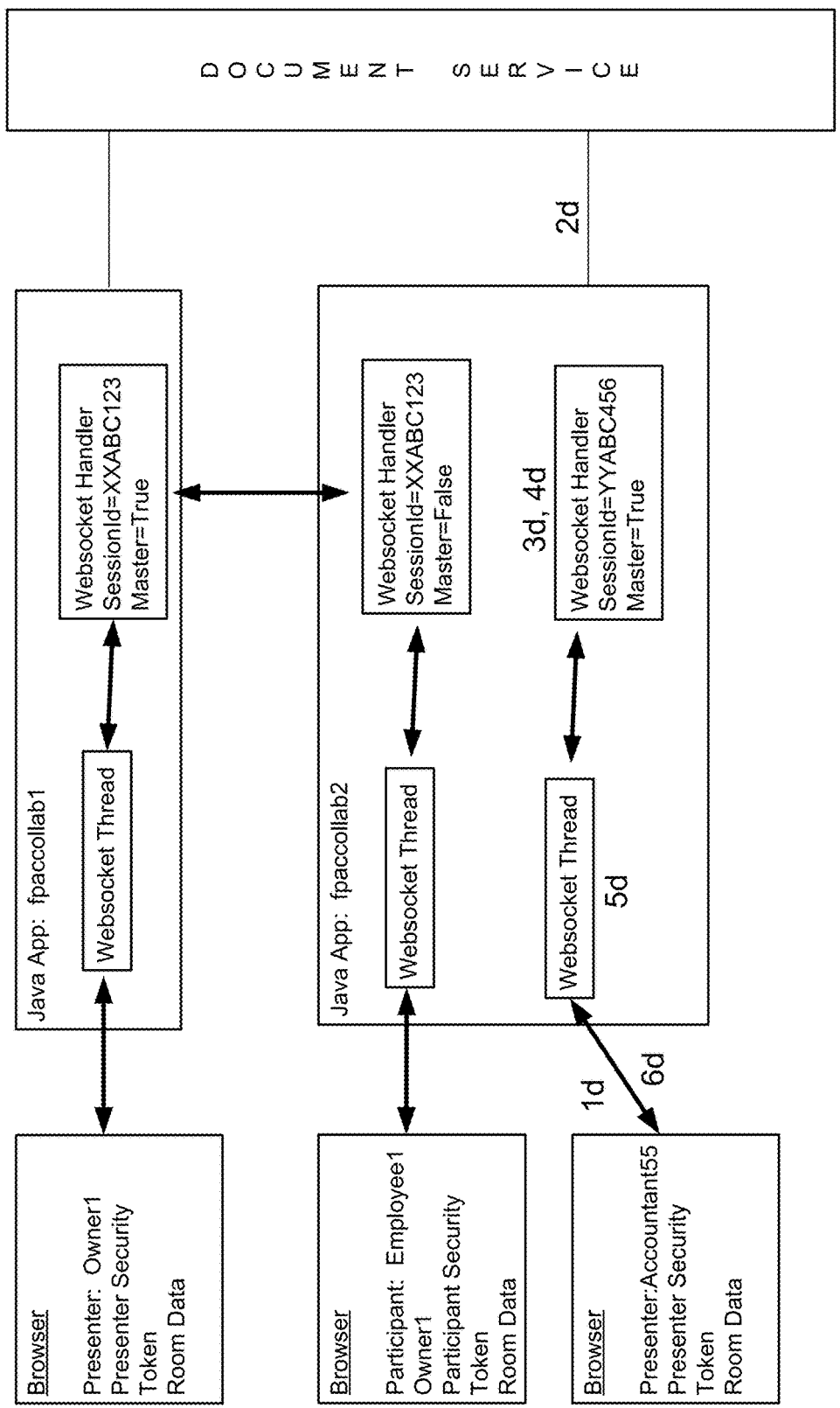
Figure 4E:
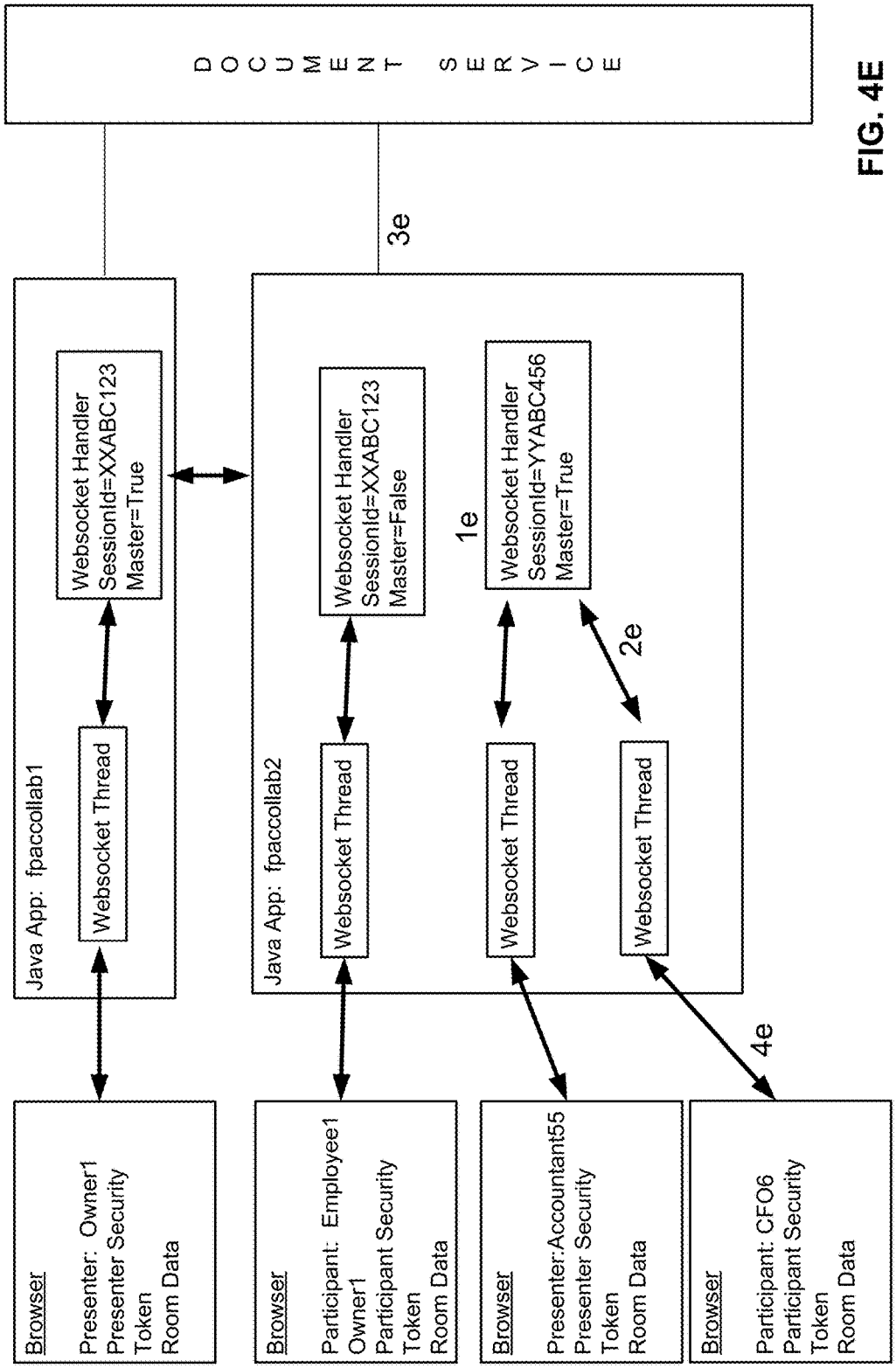

FIGS. 4D-F shows the workflow where another meeting session is created on the system. FIG. 4D shows the host presenter of the new meeting (Accountant 55) as contacting the server fpacollab2 to start the meeting, with the steps outlined below.

| Step # | Description |
| --- | --- |
| 1d | Presenter sends security information. |
| 2d | Server fpacollab2 verifies information with document service and starts new websocket handler. |
| 3d | Websocket handler sets itself as the main handler in the server fpacollab2 for SessionId = YYABC456. |
| 4d | Websocket handler sets itself as the master, flag master = True (only person in the meeting room). |
| 5d | Websocket handler completes setup with Websocket Thread. |
| 6d | Verified and approved websocket is active. |

FIGS. 4E-F show two possible scenarios for participants joining the second meeting. In particular, FIG. 4E shows the situation where the participant (CFO6) is routed by the load balancer to the same Java App server (fpacollab2) hosting the master websocket handler for the second meeting session. Specific steps are outlined in the following table.

| Step # | Description |
| --- | --- |
| 1e | The existing master websocket handler for sessionId = YYABC456 is detected. |
| 2e | Connection is established to the existing master websocket handler. |
| 3e | The document service is updated to indicate that the participant joined. |
| 4e | Verified and approved websocket is connected to the participant websocket thread. |

FIG. 4F shows the situation where a second participant (Employee9) to the second meeting is routed by the load balancer to a different Java App server (fpacollab1). Specific steps are outlined in the following table.

| Step # | Description |
| --- | --- |
| 1f | New websocket handler is created for sessionId = YYABC456. |
| 2f | Server fpacollab1 verifies with the document service sets up the new websocket handler as the slave, flag master = False. |
| 3f | The new slave websocket handler connects to the master websocket handler in the server fpacollab2. |
| 4f | Connection is made to the websocket thread and the new participant Employee9. |
| 5f | The new participant Employee9 then broadcasts its joining the second meeting to the Presenter Accountant55. |

This example illustrates the decoupling of the collaboration application from hosting websocket channels, via the document service. This can have the desirable effect of reducing load and stress on the servers of the collaboration application.

The example also shows the use of a separate security Application Program Interface (API) that is different from the websocket channel API. This allows for the application to validate users, as opposed to the meeting service managing application specific user authentication.

The example just provided is given for purposes of illustration only, and embodiments are not limited to them. Thus while the example shows clustering websocket communications implemented in a collaboration environment, embodiments are not limited to this particular context.

Moreover, while FIG. 4A depicts the collaboration servers as separate/distinct from the document service, this is not required. In certain embodiments a server could include the document service. In the collaboration context, a same remote server could host both the master websocket handler and the document service itself. Implementing the document service in an in-memory database, could leverage the processing power of an in-memory database engine in order to perform various aspects of websocket communication clustering. One example of such an in-memory database is the HANA in-memory database available from SAP SE of Walldorf, Germany.

Figure 5:
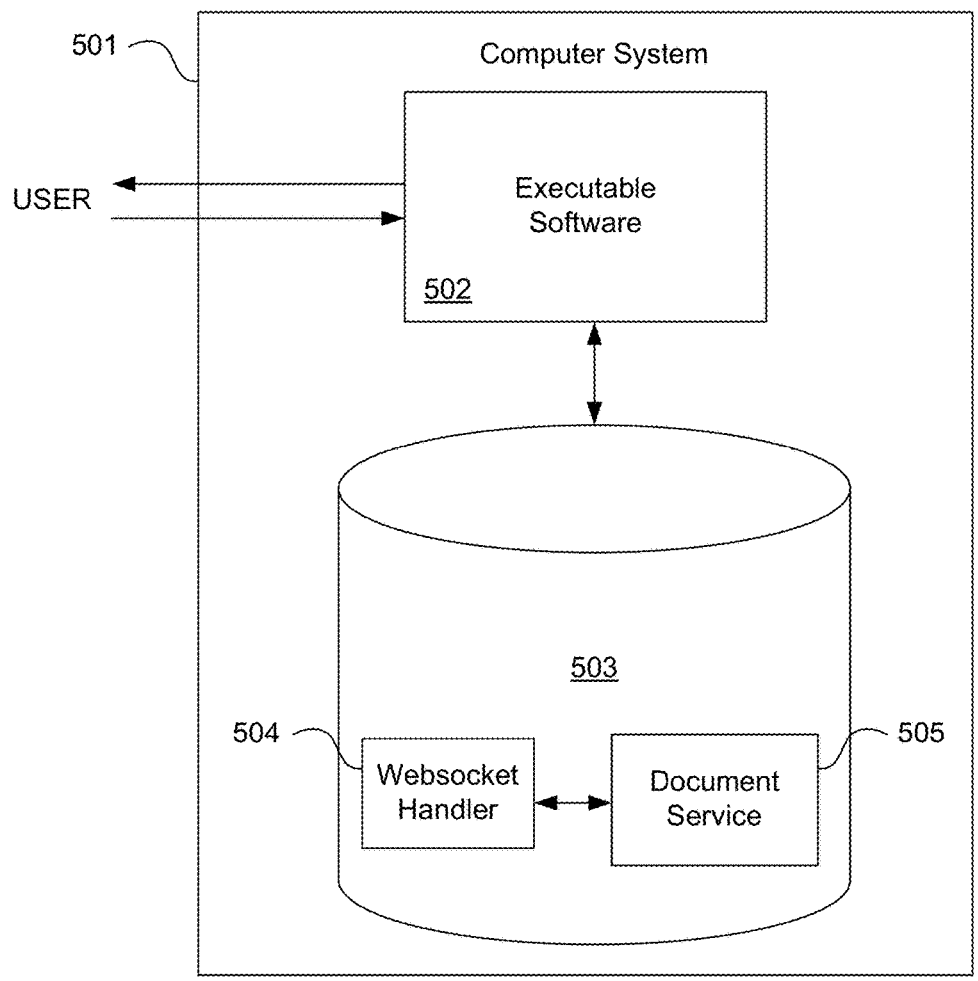
FIG. 5 illustrates hardware of a special purpose computing machine configured to implement clustering of websocket communications according to an embodiment.

FIG. 5 illustrates hardware of a special purpose computing machine configured to implement clustering of websocket communications according to an embodiment. In particular, computer system 501 comprises a processor 502 that is in electronic communication with a non-transitory computer-readable storage medium 503. This computer-readable storage medium has stored thereon code 505 corresponding to a document service. Code 504 corresponds to a websocket handler. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read.

Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
providing a document service storing server cluster information including a first cluster;
a first server receiving a first input specifying the first cluster;
in response to the first input, the first server referencing the document service to create a first master websocket handler and provide a first server address in the server cluster information;
a second server receiving a second input specifying the first cluster;
in response to the second input, referencing the document service to create a first slave websocket handler storing the first server address; and
causing the first slave websocket handler to establish a first websocket channel with the first master websocket handler using the first server address.

2. A method as in claim 1 wherein the server cluster information further includes a second cluster, the method further comprising:
the second server receiving a third input specifying the second cluster;
in response to the third input, the second server referencing the document service to create a second master websocket handler and provide a second server address in the server cluster information;
the first server receiving a fourth input specifying the second cluster;
in response to the fourth input, the first server referencing the document service to create a second slave websocket handler storing the second server address; and
causing the second slave websocket handler to establish a second websocket channel with the second master websocket handler using the second server address.

3. A method as in claim 2 wherein:
the first cluster comprises a collaboration session;
the first input includes a first security token from a presenter of the collaboration session;
the second input includes a second security token from a first participant in the collaboration session; and
the cluster information includes the first security token and the second security token.

4. A method as in claim 3 further comprising broadcasting a presence of the first participant in the collaboration session to the presenter over the first websocket channel.

5. A method as in claim 3 further comprising:
the first server receiving a fifth input specifying the collaboration session from a second participant; and
the first server routing the fifth input to the first master websocket handler.

6. A method as in claim 5 further comprising the first slave websocket handler updating the server cluster information to reflect a presence of the second participant in the collaboration session.

7. A method as in claim 1 wherein the first master websocket handler includes a flag having a value designating a master status.

8. A method as in claim 1 wherein the document service comprises an in-memory database.

9. A non-transitory computer readable storage medium embodying a computer program for performing a method, said method comprising:
providing a document service storing server cluster information including a first cluster;
a first server receiving a first input specifying the first cluster;
in response to the first input, the first server referencing the document service to create a first master websocket handler with a flag having a value designating a master status, and provide a first server address in the server cluster information;
a second server receiving a second input specifying the first cluster;
in response to the second input, the second server referencing the document service to create a first slave websocket handler with a flag having a value designating a slave status and store the first server address; and
causing the first slave websocket handler to establish a first websocket channel with the first master websocket handler using the first server address.

10. A non-transitory computer readable storage medium as in claim 9 wherein the server cluster information further includes a second cluster, the method further comprising:
the second server receiving a third input specifying the second cluster;
in response to the third input, the second server referencing the document service to create a second master websocket handler and provide a second server address in the server cluster information;
the first server receiving a fourth input specifying the second cluster;
in response to the fourth input, the first server referencing the document service to create a second slave websocket handler storing the second server address; and
causing the second slave websocket handler to establish a second websocket channel with the second master websocket handler using the second server address.

11. A non-transitory computer readable storage medium as in claim 10 wherein:
the first cluster comprises a collaboration session;
the first input includes a first security token from a presenter of the collaboration session;
the second input includes a second security token from a first participant in the collaboration session; and
the cluster information includes the first security token and the second security token.

12. A non-transitory computer readable storage medium as in claim 11 wherein the method further comprises broadcasting a presence of the first participant in the collaboration session to the presenter over the first websocket channel.

13. A non-transitory computer readable storage medium as in claim 11 wherein the method further comprises:
the first server receiving a fifth input specifying the collaboration session from a second participant; and
the first server routing the fifth input to the first master websocket handler.

14. A non-transitory computer readable storage medium as in claim 13 wherein the method further comprises:
the first slave websocket handler updating the server cluster information to reflect a presence of the second participant in the collaboration session.

15. A non-transitory computer readable storage medium as in claim 9 wherein the document service comprises an in-memory database.

16. A computer system comprising:
one or more processors;
a software program, executable on said computer system, the software program configured to:
cause an in-memory database to store server cluster information including a first cluster;
cause a first server to receive a first input specifying the first cluster;
in response to the first input, cause the first server to reference the document service to create a first master websocket handler and provide a first server address in the server cluster information;
cause a second server to receive a second input specifying the first cluster;
in response to the second input, cause the second server to reference the document service to create a first slave websocket handler storing the first server address; and
cause the first slave websocket handler to establish a first websocket channel with the first master websocket handler using the first server address.

17. A computer system as in claim 16 wherein the server cluster information further includes a second cluster, and the software is further configured to:
cause the second server to receive a third input specifying the second cluster;
in response to the third input, cause the second server to reference the document service to create a second master websocket handler and provide a second server address in the server cluster information;
cause the first server to receive a fourth input specifying the second cluster;
in response to the fourth input, cause the first server to reference the document service to create a second slave websocket handler storing the second server address; and
cause the second slave websocket handler to establish a second websocket channel with the second master websocket handler using the second server address.

18. A computer system as in claim 16 wherein:
the first cluster comprises a collaboration session;
the first input includes a first security token from a presenter of the collaboration session;
the second input includes a second security token from a participant in the collaboration session; and
the cluster information includes the first security token and the second security token.

19. A computer system as in claim 18 wherein the software is further configured to broadcast a presence of the participant in the collaboration session to the presenter over the first websocket channel.

20. A computer system as in claim 16 wherein the first master websocket handler includes a flag having a value designating a master status.

* * * * *